United States Patent [19]

Tackles

[11] Patent Number: 4,515,448
[45] Date of Patent: May 7, 1985

[54] SUNGLASSES

[75] Inventor: George Tackles, Livermore, Calif.

[73] Assignee: Oakley, Inc., Irvine, Calif.

[21] Appl. No.: 479,836

[22] Filed: Mar. 28, 1983

[51] Int. Cl.³ .................. G02C 7/00; G02C 7/16; G02C 7/12
[52] U.S. Cl. ................................ 351/41; 351/44
[58] Field of Search ............... 351/41, 44, 45, 46, 351/47, 48, 49; 350/432

[56] References Cited

U.S. PATENT DOCUMENTS 3,531,189 9/1970 Petito ..................................... 351/47
3,689,136 9/1972 Atamian ................................ 351/44

Primary Examiner—Rodney B. Bovernick
Attorney, Agent, or Firm—William W. Haefliger

[57] ABSTRACT

Sunglasses have transparent panes extending in frusto conical planes. The sunglasses frame construction permits ease of pane removal and replacement.

7 Claims, 6 Drawing Figures

U.S. Patent    May 7, 1985    4,515,448
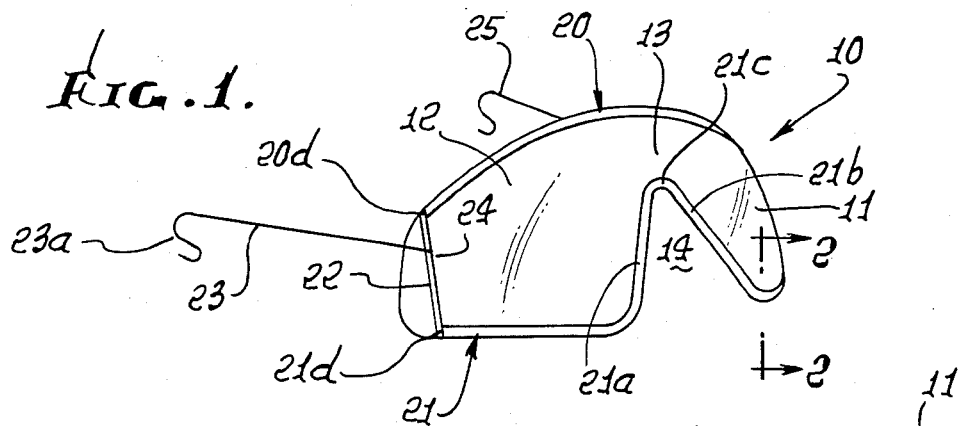
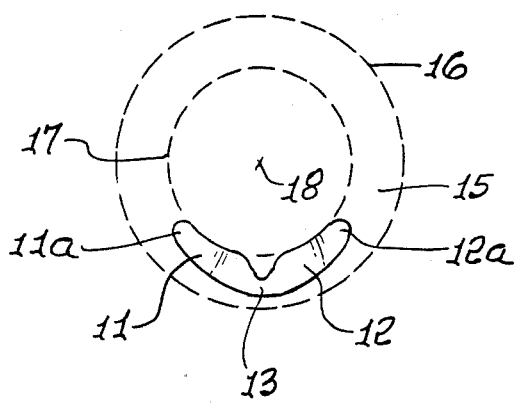
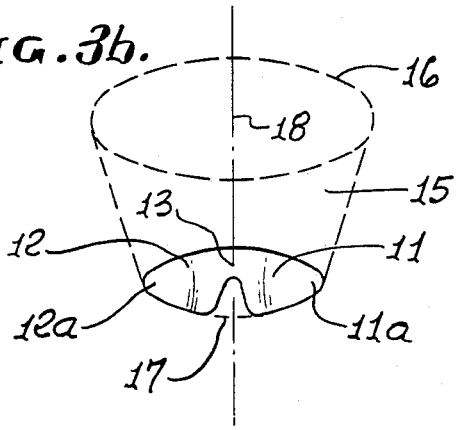
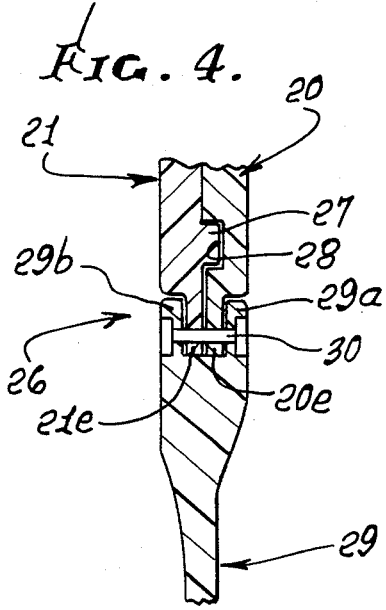

4,515,448

SUNGLASSES

BACKGROUND OF THE INVENTION

This invention relates generally to eyewear, and more particularly to construction of sunglasses.

There is a need for sunglasses which more completely intercept sunlight at the top, bottom and sides of the glasses; also there is need for sunglasses which permit ease of pane or lens removal and replacement, and for simplicity of frame and lens assembly construction.

SUMMARY OF THE INVENTION

It is a major object of the invention to provide improved sunglasses which meet the above needs, and which also incorporate other unusual advantages in construction, modes of adjustment, and results, as will appear. Basically, the improved eyeglasses comprise transparent lenses or panes located to extend in the paths of the wearer's fields of vision, frontwardly and sidewardly; and the lenses extending in planes which are generally frusto-conical. Typically, the lenses merge at a bridge region, and the latter and the lenses define a common frusto-conical plane that extends close to the wearer's cheeks and forehead, while wrapping around the side of the head to intercept peripheral vision. The result is better interception of sunlight, top to bottom and side-to-side, the lenses matching closely the wearer's facial contour. No distortion is introduced because of absence of local suddenly increased curvature or breaks in shape.

The frame is also formed in frusto-conical shape to match the lenses, at their top and bottom edges, as will appear, and to allow ease of lens removal and replacement. To this end, the frame typically includes upper and lower sections that are separately adjustable, i.e. bendable relative to the lenses, the sections interconnected as will appear, allowing ease of adjustment of arms that connect to the wearer's ear as well as closer adjustment of the frames to the wearer's face.

These and other objects and advantages of the invention, as well as the details of an illustrative embodiment, will be more fully understood from the following specification and drawings, in which:

DRAWING DESCRIPTION

FIG. 1 is a perspective of a pair of sunglasses incorporating the invention;

FIG. 2 is an enlarged view on lines 2—2 of FIG. 1;

FIG. 3a is a schematic bottom plan view showing of frusto-conical sunglasses development;

FIG. 3b is a schematic elevational view showing, in perspective, of frusto-conical sunglasses development;

FIG. 4 is an enlarged plan view of a top and bottom frame and ear stem junction; and FIG. 5 is a reduced side view showing of the top and bottom frame and ear stem junction.

DETAILED DESCRIPTION

The protective eyeglasses, as for example sunglasses shown at 10 in FIG. 1 include transparent panes or lenses 11 and 12 located to extend in the direct path of the wearer's left and right eye fields of vision. Those panes may merge as at bridge 13 directly above the wearer's nose, a generally triangular nose opening being formed at 14.

It is a feature of the invention that the panes and bridge extend in planes which are substantially or generally frusto-conical, and most preferably are very nearly frusto-conical. FIGS. 3a and 3b show a single frusto-conical surface 15 formed between upper larger circle 16 and lower smaller circle 17, the circles having a common vertical axis 18. The panes and bridge 11–13 are formed by or on that surface 15, as indicated, whereby their curvatures conform very well to the natural curvature of the wearer's face, i.e. his cheek bones and forehead as well as side face configuration. Note that panes 11 and 12 wrap backwardly or rearwardly at 11a and 12a to extend in the paths of the wearer's sideward fields of vision, without such abruptly changing curvature as would distort the light passing through the side wrapping portions of the panes. The planes of panes 11 and 12 are symmetrically located at opposite sides of a plane containing axis 18 and bi-secting the bridge 13.

Also provided are a top frame 20 bounding upper edges of the panes 11 and 12 as well upper edge of transparent bridge 13, and bottom frame 21 bounding lower edges of the panes. The bottom frame also includes an intermediate portion having legs 21a and 21b convergent upwardly toward a bridge 21c bounding the lower edge of transparent bridge 13. The frames also conform to the overall frusto-conical shape of the panes. The frames curve rearwardly, and in FIG. 1 they terminate as at 20d and 21d, the pane 11 curving and projecting rearwardly beyond those terminations to extend unobstructedly at 11a in the path of the wearer's side vision. A small wire strut 22 extends generally vertically between terminations 20d and 21d to support arm 23 at 24. Arm 23 extends rearwardly to hook at 23a over the ear. The same construction is employed at the opposite side of the sunglasses assembly, to support arm 25.

In the modified form seen in FIGS. 4 and 5, the frames 20 and 21 converge rearwardly, at each side of the sunglasses, to merge at junction regions 26, which are rearward of the rearwardmost extents of pane portions 11a, and 12a. Accordingly, and again, the wearer's side vision is not obstructed. The frames, at each region 26, define interfitting tongue and groove elements (as at 27 and 28), that interlock to orient the frames relative to one another. Elements 27 and 28 may be polygonal to interfit so as to prevent relative rotation. This prevents frame twisting, as well as lens or pane "pop-out", inadvertently.

As shown in FIG. 4, the arm 29 that extends rearwardly to the wearer's ear has pivotal connection to the merged frames, which allows angle adjustment by the wearer. In the illustrated example, the frames have tongues 20e and 21e that project between forked extents 29a and 29b of arm 29. A releasable pin 30 extends through tongues 20e and 21e, and forked extents 29a and 29b, to provide such pivoting.

The frames and arms may consist of molded plastic material, and the panes or lenses may consist of plastic or glass thin sheets, appropriately tinted or darkened.

FIG. 2 shows the reception of the edge 11f of pane or lens 11 in a groove 35 formed by frame 21, facilitating ease of removal of the lenses from the frames, for replacement.

I claim:

1. In protective eyeglasses having left and right sides, the combination comprising (a) transparent panes located to extend in the path of the wearer's field of vision, frontwardly and sidewardly, (b) said panes shaped frusto-conically, (c) said panes merging together at a bridge region adapted to extend over the wearer's nose, thereby to define one pane which extends continuously and generally frusto-conically across the wearer's field of vision between said left and right sides, (d) and including a top frame bounding upper edges of said panes, and a bottom frame bounding lower edges of said panes, said frames being removable from said panes, and being everywhere spaced apart between said left and right sides, and also at said bridge region.

2. The combination of claim 1 wherein said panes curve rearwardly to extend in the paths of the wearer's sideward fields of vision.

3. The combination of claim 1 wherein said panes curve rearwardly to define rearward edges free of said frames and to extend in the paths of the wearer's sideward fields of vision, which paths are unobstructed by said frames.

4. The combination of claim 3 wherein said top and bottom frames interlock rearwardly of said pane rearward edges.

5. The combination of claim 4 wherein said frames define interfitting tongue and groove elements which define said interlock.

6. The combination of claim 5 including arms adapted to extend rearwardly to the wearer's ears, said arms having pivotal connection to the two frames.

7. The combination of claim 1 including struts interconnecting said top and bottom frames proximate the ends thereof, and arms pivotally connected to said struts and adapted to extend rearwardly to the wearer's ears.

* * * * *